J. A. OSBORN.
PASSENGER AND LUGGAGE CARRYING ATTACHMENT FOR MOTOR CYCLES.
APPLICATION FILED APR. 2, 1912.
1,057,661.
Patented Apr. 1, 1913.
2 SHEETS—SHEET 1.
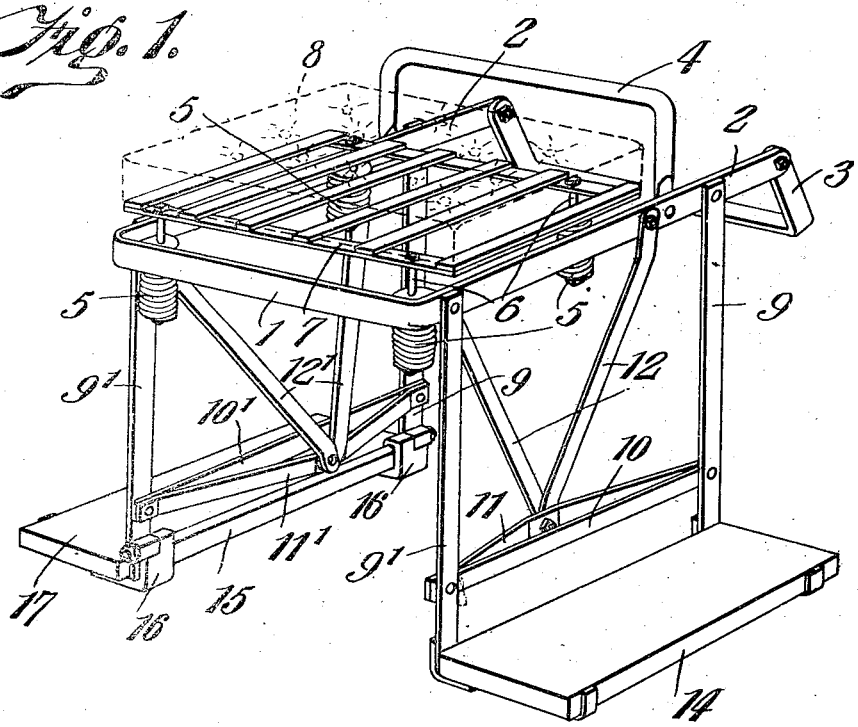
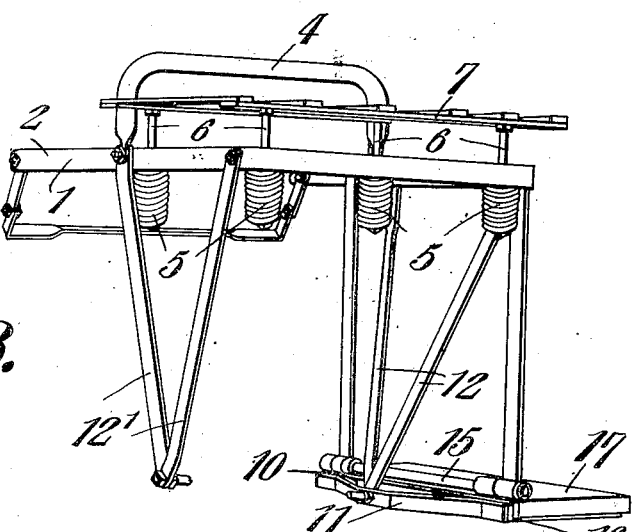
Witnesses
John A. Osborn, Inventor
by
Attorneys J. A. OSBORN.
PASSENGER AND LUGGAGE CARRYING ATTACHMENT FOR MOTOR CYCLES.
APPLICATION FILED APR. 2, 1912.
1,057,661.
Patented Apr. 1, 1913.
2 SHEETS—SHEET 2.
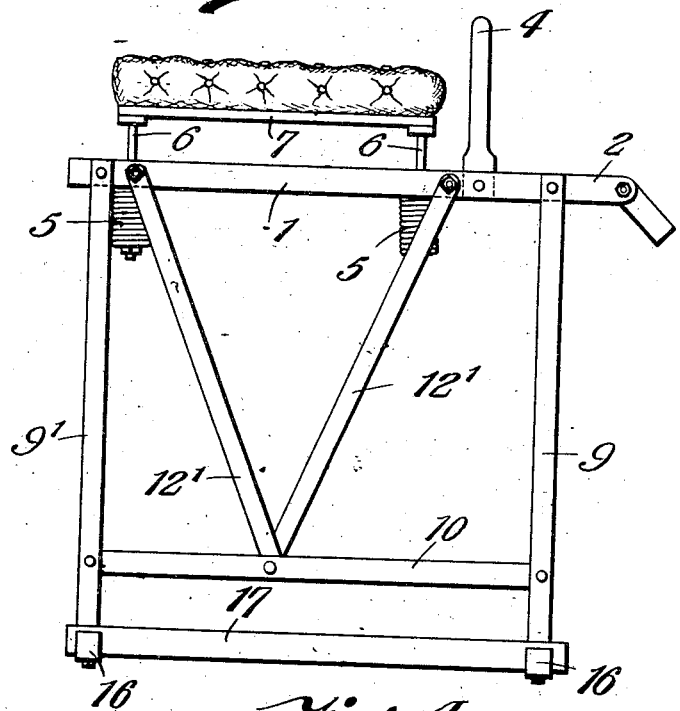
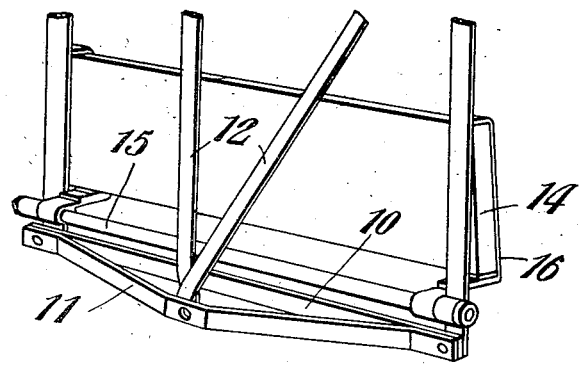
Witnesses
John A. Osborn, Inventor.
by C. A. Snow & Co.
Attorneys.

UNITED STATES PATENT OFFICE.

JOHN A. OSBORN, OF HAMMONDSPORT, NEW YORK.

PASSENGER AND LUGGAGE CARRYING ATTACHMENT FOR MOTOR-CYCLES.

1,057,661.  Specification of Letters Patent.  Patented Apr. 1, 1913.

Application filed April 2, 1912. Serial No. 688,087.

*To all whom it may concern:*

Be it known that I, JOHN A. OSBORN, a citizen of the United States, residing at Hammondsport, in the county of Steuben and State of New York, have invented a new and useful Passenger and Luggage Carrying Attachment for Motor-Cycles, of which the following is a specification.

The present invention relates to improvements in passenger and luggage carrying attachments for motor cycles, the primary object of the present invention being the provision of a novel form of rumble seat and luggage carrier, adapted to be attached to and carried by the rear portion of the frame of a motor cycle, the same being provided with a spring cushioned seat so disposed that the occupant may be seated sidewise with both feet disposed to rest upon a running board carried upon one side or both sides of the attachment, the one not being used where two running boards are employed, being positioned for the reception of luggage, such for instance as a suit case.

A further object of the present invention is the provision of a rumble seat attachment for motor cycles, whereby the occupant is permitted to sit sidewise thereupon with both feet resting upon a foldable running board, such running board being so disposed as when not in use, to be folded in a vertical position to diminish the projection thereof beyond the sides of the motor cycle, the attachment also being further provided with a grip at the front of the seat portion, whereby the occupant while seated may grasp the same similarly to a handle bar and thus assist in retaining himself upon the rumble seat.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings Figure 1 is a perspective view of the complete attachment provided with oppositely disposed running boards. Fig. 2 is a side elevation thereof. Fig. 3 is a perspective view of the attachment having a single running board. Fig. 4 is a detailed perspective view showing the method of pivoting the folding running board.

Referring to the drawings, the numeral 1 designates the upper seat carrying or main frame of the attachment, which is preferably U-shaped so that the projecting terminals 2 thereof will have pivoted thereto the frame or yoke 3, which is disposed to be connected with the motor cycle frame at or near the seat thereof. In order to hold the terminals 2 in proper spaced relation, the handle bar 4, which is formed from a single piece of material has its terminals connected, as shown in Fig. 1, to the terminals 2 of the upper frame 1 and in such a position as to be in ready access to the person seated upon the frame 1 and just in the rear of the seat of the motor cycle. A plurality of coiled springs 5 with the stems 6 attached thereto, are disposed within the frame 1 and carry the seat carrying frame 7, whereby the cushion 8 disposed thereon will be given the proper cushion effect to take care of the jars due to the vibration of the motor and the irregularities of the road.

Connected to the outer sides of the frame 1 and depending therefrom, are the two pairs of vertical plates or arms 9 and 9' respectively, which when the attachment is in place, are disposed upon the respective sides of the rear or drive wheel of the motor cycle, the same being properly spaced apart by the bars 10 and 10', respectively, which have also connected thereto upon the inner face thereof, the curved plates 11 and 11' respectively. The two pairs of bracing plates 12 and 12' respectively, are connected to the respective sides of the frame 1, while their lower ends converge and are connected centrally of two of the curved plates 11 and 11' respectively, thus providing a rigid frame for properly supporting the pairs of depending plates 9 and 9'.

Connected to the lower ends of the pairs of vertical plates 9 are the right angled projections 13 for the reception of the running board 14, which may be made rigid and be positioned at all times as shown in Fig. 1, while pivoted in the lower end of the plates 9' by means of the rods 15, are the right angled arms 16 carrying the folding running board 17. By this arrangement, the foot board 17 may be folded to rest against the plates 9' when not in use, or assume the position as shown in Fig. 1, when used for carrying luggage.

When the device is attached for use, the plates 9 and 9' are disposed to fit astride the rear wheel, while the axle of the motor cycle has the ends thereof projected through the terminals of the braces 12 and 12' and seated within the space between the inclined plates 11 and 11' and plates 10 and 10' respectively. By this means the combined rumble seat and luggage carrier for motor cycles having a side foot rest is provided, said foot rest being so disposed that the occupant will sit sidewise upon the cushion 8 instead of astride, as is the usual practice, with rumble seats now in use. By this means the occupant is made more comfortable and can therefore ride a greater distance upon a motor cycle equipped with this attachment than with the usual form of seat; and at the same time by reason of the fact that two foot boards which have been shown in Fig. 1 are employed, the luggage may be carried by one foot board while an occupant is seated upon the cushion 8 with his feet resting upon the other foot board.

What is claimed is:

1. An attachment for motor cycles, comprising a U-shaped main frame the terminals of which are adapted to be disposed toward the seat of the motor cycle, a frame engaging bail carried in the terminals thereof, a handle bar connected intermediate of the ends of the main frame and projecting transversely thereabove, a spring cushioned seat carrying frame mounted in the main frame to the rear of the handle bar, two pairs of vertically disposed plates connected to the main frame at the respective sides thereof and adapted when the attachment is in use to be one upon each side of the rear wheel of the motor cycle, and a foot rest carried at the respective ends of each pair of plates.

2. An attachment for motor cycles, comprising a U-shaped frame, a pivoted frame engaging bail connected to the extreme terminals of said U-shaped frame, a handle bar connected to said U-shaped frame within the extreme ends of the terminals thereof and projecting above the U-shaped frame, a spring cushioned seat carrying frame supported in said U-shaped frame, two pairs of brace plates connected to the respective terminals of the U-shaped frame and at right angles thereto, the lower ends of said braces converging to fit upon the axle of a motor cycle, and platform carrying supports connected to the U-shaped frame and disposed to project exteriorly one upon each side of the rear wheel of the motor cycle.

3. An attachment for motor cycles comprising a U-shaped frame, a pivoted frame engaging bail connected to the extreme terminals of the said U-shaped frame, a handle bar connected to said U-shaped frame within the extreme ends of the terminals thereof and projecting above the U-shaped frame, a spring cushioned seat carrying frame supported in said U-shaped frame, two pairs of brace plates connected to the respective terminals of the U-shaped frame and at right angles thereto, the lower ends of said braces converging to fit upon the axle of a motor cycle, two pairs of vertically disposed plates connected to the respective terminals of the U-shaped frame at the forward and near the rear ends thereof, a transverse bar connected to each pair of plates near the lower ends thereof, an inwardly curved plate connected to said transverse bar and disposed in line with the lower terminals of the inclined braces to receive the ends of the axle of the rear wheel of the motor cycle, a rigid foot rest carried at the extreme lower ends of one pair of said vertical plates, and a folding foot rest carried at the lower ends of the other pair of plates.

In testimony that I claim the foregoing as my own, I have hereto affixed my signature in the presence of two witnesses.

JOHN A. OSBORN.

Witnesses:
HIRAM MORRISON,
GEO. H. KEELER.